United States Patent [19]
McDonald

[11] 3,930,100
[45] Dec. 30, 1975

[54] ELASTOMERIC COLD PATCH FOR PAVEMENT REPAIR

[76] Inventor: Charles H. McDonald, 3130 W. Pierce St., Phoenix, Ariz. 85009

[22] Filed: July 5, 1973

[21] Appl. No.: 376,920

Related U.S. Application Data

[63] Continuation-in-part of Ser. No. 589,190, Oct. 21, 1966, abandoned.

[52] U.S. Cl. ......... 428/323; 260/28.5 AS; 260/758; 404/32; 428/332; 428/338; 428/491; 428/492; 428/496; 428/521
[51] Int. Cl.² ................... B32B 25/02; B32B 25/06; B32B 25/08
[58] Field of Search ........... 161/238, 239, 244, 255, 161/162, 165; 404/20, 32; 260/28.5 AS, 758; 428/338, 332, 323, 491, 492, 496, 521

[56] References Cited
UNITED STATES PATENTS

| | | | |
|---|---|---|---|
| 2,310,972 | 2/1943 | Livermore | 260/760 |
| 2,578,001 | 12/1951 | Cubberley | 260/732 |
| 2,700,655 | 1/1955 | Endres | 260/28.5 |
| 3,253,521 | 5/1966 | Endres | 260/28.5 |
| 3,270,631 | 9/1966 | Bower | 106/277 |
| 3,338,849 | 8/1967 | Johnson | 260/28.5 |
| 3,568,579 | 3/1971 | Hoad | 161/406 |
| 3,644,240 | 2/1972 | Tarbell | 260/28.5 |

FOREIGN PATENTS OR APPLICATIONS
740,027   8/1966   Canada

*Primary Examiner*—George F. Lesmes
*Assistant Examiner*—Ellis P. Robinson
*Attorney, Agent, or Firm*—William G. Lane

[57] ABSTRACT

An elastomeric cold patch for pavement repair and the method of preparation thereof comprising preparing an elastomeric pavement repair composition from paving grade asphalt and rubber. The asphalt is heated to an elevated temperature and the rubber is combined therewith. The resulting hot composition is mixed to form a hot jelly composition which is formed into a layer. The top surface of the hot layer of the elastomeric composition is dressed with aggregate. Optionally, aggregate can be added into the hot elastomeric composition prior to the formation of the layer. Upon cooling of the layer of hot elastomeric material, an elastomeric cold patch is obtained. Pavements are repaired by cleaning the area of the pavement which is to be repaired, tacking the surface of the pavement and applying the hot elastomeric cold path thereto.

17 Claims, 3 Drawing Figures

ELASTOMERIC COLD PATCH FOR PAVEMENT REPAIR

This is a continuation-in-part application of my U.S. patent application Ser. No. 589,190, filed Oct. 21, 1966, now abandoned on An Improvement In The Material And Its Application For The Repair Of Asphalt And Asphalt-Type Pavement Fractures, which is incorporated by reference herein.

BACKGROUND OF THE INVENTION

The increasing volume of traffic, and particularly heavy traffic, has created a severe problem on many roads and streets in this country. This problem has resulted from elastic type failures in pavements which cause a "chicken-wire," or "alligator" cracking pattern in the pavement surface. This cracking is caused by fatigue of the pavement surface from repeated deflection. Conventional repairs by asphalt overlays are usually effective for a short period only and many other more drastic major repairs such as replacing the pavement surface or the pavement surface and its foundation, are too expensive and often as ineffective as asphalt overlays.

The so-called "flexible-type pavement" is actually not a particularly flexible structure. There are occasions when flexible-type pavements could be classified as very brittle, particularly in cold weather or when the pavement surface has suffered a long period of embrittlement from oxidation and age. The cracking caused by this lack of flexibility has created a tremendous problem, when considered on a nation wide scale. Traveling over the streets and highways of this country, one can seldom go more than a few miles without finding distressed pavement which is basically caused by repeated flexing by the surface of the pavement under the traffic loads.

This type of failure has been variously defined as flexure cracking, elastic-type failure, and fatigue failure. It is characterized by multiple cracking of the "chicken-wire," or "alligator" type pattern without plastic deformation of the pavement surface. The cracking is due to fatigue of the bituminous pavement mixture from repeated deflection of the pavement surface under vehicle load and subsequent recovery of the pavement surface. This deflection and recovery is caused by elasticity of some member of the substructure or foundation of the pavement surface. Fatigue failure is the most prevalent of the three most common types of failure occuring in flexible-type pavements. The other types of failure are:

1. The plastic type of failure, which is manifested by cracking in the pavement surface of the same character as found in elastic-type of failure, but is also accompanied by plastic deformatioin of the pavement surface. The surface is depressed under the loaded area and usually slightly raised at one or both sides of the loaded area. This type of failure is usually caused by an inadequate thickness of base material and is no longer a serious problem on highways or streets built under modern design criteria; and 2. The surface-type failure, which is characterized by attrition, or stripping and emulsification of the asphalt in a surface of the pavement. There is raveling and loss of material in the surface but no significant amount of cracking in the surface. Although this type of failure is very common, it is not as serious as fatigue-failure because it can be corrected by the application of a seal coat.

Fatigue cracking resulting from elastic-type failure is entirely different from the above two types of failure, and solutions to fatigue cracking have not only been difficult and expensive, but in many cases quite uncertain in their result because there is resilience in some member of the substructure. This resilience must be counteracted by either making the substructure or the surface so rigid that it cannot bend, or by making the surface so flexible that it will take the bending. Part of the difficulty in solving this problem lies in the fact that the deflections required to produce elastic-type failure are so small that almost complete elimination of the resilience in the substructure is required. Repeated deflections of a very small order are sufficient to produce this type of failure. Various authorities have given figures for a critical deflection which range from 0.010 to 0.050 inches with a certain probability that the critical deflection would vary considerably for pavements of different thicknesses, composition, asphalt grade, asphalt content, asphalt quality, prevailing temperatures, and a radius of the deflection curve (see McDonald, C. H.; The Elastic Type of Pavement Failure and Some of Its Causes; 38th annual Conf. of WASHO; 2) Hveem, F. N.; Pavement Deflections and Fatigue Failures; HRB BULL. 114 pp. 43–79, 1955, 3) McDonald, Charles H.; The Flexural Failure of Sand-Asphalt Mixes as Related to Resilient Subgrades, Highway Materials Conf., Denver, CO, 1959.).

Complicating the solution to the problem of repairing fatigue cracking from elastic-type failure is the fact that the source of such a small magnitude of elasticity may be difficult to determine. The elasticity may be either in the subgrade, subbase, or base course. An increase in the normal moisture content of even a good subgrade, caused by frost action for instance, may cause the subgrade to become "quickie" resulting in a condition where vehicle load is born by hydrostatic pore pressure. Although such a condition does not ordinarily last for a long time, there is almost no reasonable thickness of overlying material or pavement that will prevent the deflection caused by the vehicle load on the pavement surface. The pavement surface of a four foot fill over a quickie soil has been observed to visibly deflect under vehicle load. This condition also develops in densely graded base courses through frost action.

Certain materials present in soils, such as mica, have elasticity within themselves, and the economic necessity of using local materials may require that these materials be incorporated in the structure. Such materials are often the only ones available in the particular area that can be used without incurring excessive costs for preparation and construction of the substructure. Perhaps the most common cause of substructure elasticity is entrapment of minute quantities of air in fine-grained subgrade soil. Any soil which is capable of moderate capillary pressure can entrap air under certain moisture conditions by holding it in pores which are sealed on all sides by capillary moisture. Capillary pressure is sufficient to prevent the air from being expelled under traffic loading. If enough of these entrapped air cells are involved in a substructure, the structure has a pneumatic character. In extreme cases such soils have an almost rubber-like elasticity when pressed between the fingers. The moisture content need only be slightly above optimum to entrap air. This type of soil is surprisingly prevalent throughout the United States. In my opinion, the increasing use of cement-treated bases is, whether recognized or not, an attempt to overcome this problem of substructure elasticity by stiffening the substructure with cement. The so-called "up-side-down" method of construction in which the subbase is cement-treated, rather than the base, is quite obviously an attempt to stiffen the substructure against resilience from an underlying member. This is practiced rather commonly in New Mexico and Arizona (see Johnson, Charles W.; "Comparative Studies of Various Combinations of Treated and Untreated Bases and Subbases for Flexible Pavements", ARB BULL. 289, pp. 44–56, 1961; and Arizone Highway Department, Special Provisions, Interstate Projects on I-10-4, "Tucson to Picacho Peak.").

The use of rigid portland cement concrete pavements has also been quite effective; however, the cost is generally prohibitive for indiscriminate use. Again, the obvious motive in using rigid concrete pavements is to make the pavement structure so rigid that it will not be affected by resilience of the substructure.

An attack against this type of failure, elastic-type failure, has also been mounted from the other standpoint of attempting to make the bituminous mixture more flexible (see McDonald, Charles H.; The Need for Greater Flexibility in the Surface of Flexible Type Pavements, Conf. on Soils Eng., Univ. of Ariz. Tucson, 1954). This has been done by the use of open-graded plant mixes employing very heavy asphalt films on each aggregate particle of the pavement mixture. These mixes have large void spaces so that the high asphalt content, in relation to surface area, will not cause distress. This type of pavement design has helped to ameliorate the situation, but it has not been a cure all.

Similarly, small percentages of rubber incorporated in mixes have also been used. These small percentages of rubber have undoubtedly been beneficial, although information on the degree of success obtained with these mixes for this purpose appears to be somewhat limited. It is my opinion, that the cost of these materials has prevented the use of rubber in the amounts necessary to give the pavement true elasticity. I recognized that an entirely new approach was needed to repair pavements subject to elastic-type failure and that the approach I developed and invented, which is described below, is completely different in its use of rubber from anything which I have read. My approach embodies the use of a relatively high percentage of rubber, combined with asphalt, in a relatively thin application to the pavement surface. The purpose is to keep the overall cost in balance but still obtain maximum elasticity of the patching material. This approach is unique and, to this date has been completely successful in some extremely difficult situations.

Asphalt-rubber compositions are described and claimed in many patents; however, none of these patents disclose the unique elastomeric material that I have prepared from rubber and asphalt. Preparations of asphalt containing rubber have been prepared in the past by workers in the art. For example, the Wilkinson U.S. Pat. No. 108,666 discloses a roofing compound composed of ground anthracite coal, ground gypsum, ground tan-bark, India rubber dissolved and prepared coal tar and/or commercial pitch. In the Tickstone U.S. Pat. No. 1,590,644 a hard composition containing rubber and bitumen is disclosed which is useful as a substitute for porcelain, earthware, ebonite, vulcanite and the like is disclosed. This composition contains principally slate powder and lesser amounts of ground rubber and optionally bitumen and/or coloring matter. The Sadtler U.S. Pat. No. 1,758,913 discloses a rubberized-asphalt mixture which is useful as a road covering. The mixture is prepared by adding aggregate to a pug mill; adding liquefier or asphalt-solvent to saturate the entire aggregate; adding rubber to the saturated aggregate so the finished mixture contains only ½ of one percent rubber based on the weight of the total asphalt added; adding asphalt or other bituminous material to the mixture at a temperature of 250°F or higher. The Grant U.S. Pat. No. 2,040,256 discloses a rubberized-asphalt composition for sealing pipe joints and the like. The composition is prepared by melting asphalt at a temperature not in excess of 180°C (375°F). Ground tacky rubber is added to the molten asphalt. The resulting mixture is raised to a temperature of 245°C (475°F) for a period of not less than 10 minutes. The temperature is maintained while the mixture is stirred until no lumps of rubber are detectable in the mixture. The resulting composition consists of 0.5 to 15% rubber and 99.5 to 85% asphalt. The ductility of the composition is slightly less than that of the asphalt and its penetration is not more than 2% less than that of the asphalt. The Rhodes et al. U.S. Pat. No. 1,884,240 discloses a rubberized-tar product prepared by heating and stirring rubber, water-gas tar and coal tar and/or pitch until a homogenous mass is obtained. Sulfur is added to the mixture and thoroughly mixed therein. The Taylor U.S. Pat. No. 2,686,169 discloses a method of incorporating rubber latex into hot bitumen, the resulting composition contains 2 to 6% rubber. The Endres et al. U.S. Pat. No. 2,700,655 discloses a powdered rubber-containing composition for incorporation in the asphalt. The powdered composition contains from 10 to 50% rubber and from about 90 to 50% filler. Dasher U.S. Pat. No. 2,853,742 discloses a method of producing powdered rubber from scrap vulcanized rubber material which can be employed for mixing with asphalt for the production of bituminous concrete paving mixtures as well as in the production of various types of asphalt coatings and similar compositions in which it is desired that a portion of the rubber be present in the coating. The rubber is prepared in a Banbury machine. The Endres et al. U.S. Pat. No. 3,127,367 discloses a method and apparatus for adding latex to hot asphalt to obtain a composition containing between 1 and 2% rubber. The Endres et al. U.S. Pat. No. 3,202,623 discloses a dry, powdered rubberized composition for incorporating into asphalt. The composition is prepared by combining a water suspension of hard bitumen with rubber latex and then co-precipitating the mixture by means of a coagulant to yield a product containing 5 to 40% by weight rubber. The Peaker et al. U.S. Pat. No. 3,242,114 discloses a method of dispersing a rubber-resin composition into asphalt. The resulting composition contains from 1 to 20 parts of rubber per hundred parts of asphalt. The Endres U.S. Pat. No. 3,253,251 discloses paving blocks composed of rubberized bitumen cement and rubber aggregate. This invention can be visualized as blocks of aggregate rubber particles bound by rubberized-asphalt cement. The rubberized bitumen cement contains a very small percentage of rubber.

A commercial product, Ramflex, a powdered rubber specially devulcanized in less than 5 minutes for use in combination with asphalt and aggregate, for asphaltic-type pavement is produced by the U.S. Rubber Reclaiming Company, Inc. RAMFLEX rubber is mixed in a pug mill with asphalt and aggregate. Five to 10 percent of RAMFLEX rubber is used for each part of asphalt employed in the total mixture. The total mixture is prepared by adding hot stone or sand and filler to a pug mill in the usual manner; then RAMFLEX rubber is added to the pug mill and mixed 10 to 20 seconds; finally the asphalt is mixed therein for an additional 30 seconds. The material is then ready for application.

The above patents show that rubberized-asphalt compositions are old in the art. However, not one of the previous workers in the field made the startling discovery that when certain portions of rubber and asphalt are heated and mixed together a jellied composition is formed which can be used in an excellent elastomeric cold patch for pavement repairs.

SUMMARY OF THE INVENTION

The present invention is directed to a method of repairing pavements, such as roads, run ways, walk ways, and roofs, which are subject to cracking, especially fatique-type cracking characterized by an alligator cracking pattern. The method comprises applying a cold patch to the area to be repaired. The area to be repaired is first cleaned of all loose debris. Before application of the elastomeric patch, the pavement area to be repaired is tacked with a binder such as cut-back asphalt, hot tar, and the like. The cold patch is applied to the tacked area.

The present method is especially useful for the repair of relatively small areas of cracked pavement. Under the present method of repair, the surface, the base and subgrade of the pavement do not have to be dug up and replaced with new materials as would be necessary for permanent rapair of the pavements by existing methods.

Repair of pavements employing the elastomeric cold patch of the present invention is analogous to binding wounds with a "Band-Aid" surgical dressing and is an original and unique application of the repair patch principle. The prefabricated patch employed in the present method will be synonymously referred to herein as the prefabricated elastomeric cold patch, the elastomeric cold patch, the elastomeric patch, the cold patch and the patch.

Repairs made with the present patch are more permanent than those made with existing materials because the patch is completely elastic and the elastomeric material does not crack under repeated deflections as do conventional patching materials. A high percentage of the maintenance costs of repairing asphalt surfaces arises from the fact that repeated repairs of the same location, caused by movement of the substructure, are required when fatigue-type cracking of pavement is involved.

The elastomeric material of the cold patch is a formulation of paving grade asphalt with penetration ranges of 10 through 300 and commercially-processed reclaimed rubber or unprocessed rubber buffings and aggregate (crushed rock, gravel, or stone). The asphalt and rubber are combined in proportions and at temperatures to form a gel which, when cooled, results in a tough, elastic mass. The mineral aggregate is added either to the hot mixture of asphalt and rubber, or subsequently after it is formed into a hot patch.

The use of asphalt containing rubber in such high percentages and temperatures as to cause gelling in the formation of a completely elastic mixture when heated, fortified with crushed rock for wearability, is unique in its formulation and its application for pavement repairs. Previously known uses of combination of asphalt, rubber and aggregate in surface applications for repair of asphalt roadways have depended upon the aggregate component for the body of the mixture. Approximately 95% of the prior art mixture would be aggregate and the remainder would be asphalt containing about 5% rubber, that is rubber would constitute 0.25% of the total mixture. The resultant conventional repair mixture is a stiff and relatively non-elastic mass when cooled that can only absorb limited pavement movement without cracking.

The unique concept in the elastomeric material of the present invention and its application lies in the fact that the asphalt-rubber component is depended upon for the body of the mixture in contrast to aggregate as in the prior art mixtures. In the present application, the final patch is comprised of approximately 10 to about 50% of the elastomeric material and about 50% to about 90% of aggregate although smaller and larger amounts of aggregate can be used. By making the rubber content of the elastomeric material high enough (approximately about 25 to about 33%) a solid is formed when the rubber and asphalt are heated to a gel and allowed to cool which is completely elastic and will move with the underlying surface without cracking. In the present application, the aggregate component only takes the abrasive wear of traffic and does not constitute the working body of the mixture. In the present application, the aggregate may be used as a dressing only instead of being mixed integrally.

I have found that a rubber-asphalt material could be made to have the consistency of a thick slurry or gel when hot which forms a tough elastic mass when cooled. I have found that the best consistency for our purpose could be obtained by heating paving grade asphalt to from about 300° and about 500°F and then stirring into it rubber, such as partially devulcanized reclaimed rubber (a commercial product), in the proportion of about 2 to 3 parts of asphalt to about one part of rubber. The laboratory tests showed that the consistency of the final product depended not only on the rubber content, but also on degree of solution or jelling and surface interaction of the rubber. The higher the temperature of the mixture, the greater the degree of solution and surface interaction of the rubber and the aspahlt and the more nearly the end product resembled the properties of rubber rather than asphalt. In other words, when the material is mixed briefly at a temperature of 350°F it is quite fluid and has a consistency of a thin slurry. This would be very convenient for placing; on the other hand, it would be more temperature susceptible so that it would tend to bleed more readily in the summer, be more brittle in cold weather, and would have less elasticity than a thicker product. A similar situation occurs when the rubber content of the material is reduced. In other words, the material can be made at any consistency desired, but it must be remembered that in doing so the properties of the final product will be changed. The thinner the hot product, the more nearly its properties will resemble those of asphalt and the thicker the hot product given the same proportions of rubber and asphalt, the more the end product will resemble rubber.

The elastomeric composition of the cold patch has been prepared from a variety of rubbers, such as ordinary reclaimed rubber obtained from a local vulcanizing shop. The reclaimed rubber was a finely granulated product obtained from the buffing of tires for recap. This material can be mixed in the proportion of about 2 to about 3 parts of paving grade asphalt to one part of reclaimed rubber. Ground whole tire rubber, asphalt soluble rubber, unprocessed rubber tire buffings and salvaged tire rubber can also be used in the elastomeric material.

The elastomeric material of the cold patch consists essentially of asphalt and rubber of certain proportions which have been heated together within a specified temperature range to form a jellied composition. The hot jellied composition is formed into a layer and allowed to cool to form the patches of the present invention. Prior to cooling, the hot composition is dressed with aggregate. Alternatively, aggregate is mixed with the hot jellied composition before it is spread out as a layer or patch. The claimed material consists essentially of paving grade asphalt and rubber in the ratio of about 2–3 to about 1 by weight respectively. The asphalt is heated to a temperature between about 350° and about 500°F and the rubber is mixed therein to form a reaction product, the jellied composition. This elastomeric cold patch has several exceptional and unexpected properties. For example, it does not reflect underlying fatigue cracks after application on the cracked distressed pavement. As shown above, the conventional pavement repair materials such as hot mix, sand-asphalt and slurry seal cannot be successfully employed to repair cracked-distressed pavements because cracks reflect through the repair material. Surprisingly, the claimed cold patches can be used to successfully repair cracked-distressed pavement by merely covering the surface of the pavement with a cold patch of relatively thin dimensions, e.g. about ¼ inch thick. In addition, the elastomeric cold patch has excellent and unexpected weatherability and wearability on pavement. The elastomeric cold patch has shown exceptional wearability under severe traffic conditions. Because of its repair, weatherability and wearability characteristics, the claimed invention has seen varied use, such as on highways, mountain roads, desert roads and airport runways, over the last several years.

The novel elastomeric cold patch of the present invention on a weight basis is not as inexpensive as conventional repair materials. However, the cost of the material is not out of line with heavier overlays which are commonly used and generally unsuccessful in combating the problem of fatigue cracking or with slurry seals also commonly used and generally unsuccessful in preventing reflection cracking. In maintenance repair work, the cost of the material is relatively a minor item. The big cost item in maintenance repair work is the labor involved. A product that will eliminate repeated repairs to the same distressed pavement area has a tremendous economic advantage over the conventional repair materials. Moreover, the present patch is applied to the pavement in relatively thin layers between 1/20 and ½ inch in thickness. Since the patch can be layed in relatively thin layers the economics of the present product are not out-of-line when compared with conventional materials.

The elastomeric cold patch of the present invention will bond fractured pavement together with an elastic bond to prevent further surface cracking and penetration of moisture. Other materials used for this purpose, such as asphalts, or asphalts with little rubber content, are primarily plastic with little or no elasticity to take or recover from repeated deformation, particularly in cold weather when they become very brittle. The elastomeric patch of the present invention is unique in that it retains some flexibility under all weather conditions.

DETAILED DESCRIPTION OF THE INVENTION

The cold patches of the present invention can be prepared by heating asphalt to a temperature between 300° and 500°F. Various grades of paving grade asphalt can be used such as 40-50, 85-100, 200-300 and the like. Ground or particulate rubber is added to the hot asphalt and mixed therein to form a hot jellied composition. With the temperatures in excess of 440°F, the elastomeric composition is normally formed in a period of time less than 5 minutes. With the temperatures of less than 440°F, the jellied composition takes longer to form; the reaction time increasing with lower reaction temperature. The hot elastomeric material can then be applied to sheets of paper, cardboard, fabric or plastic to form a layer of hot material on the sheet. Preferably the patch is formed in a form to give a patch of relatively uniform depth. Normally between ½ and about 1 gallon of the hot elastomeric material are applied per each square yard of sheet. However, lesser amounts, such as 1/4 gallon per square yard or greater amounts such as 2 ½ gallons per square yard can also be applied. When the hot composition cools, the layer of hot elastomeric material normally is from about 0.1 to about 0.5 inches in thickness. However, thinner layers such as paper-thin layers or thicker layers, such as layers as inch thick, can also be formed and used. After application of the hot elastomeric material and before it cools, and sets up, the layer is dressed with an aggregate cover that is preferably tamped or rolled into the elastomeric material. Between about 20 and about 50 pounds of conventional mineral aggregate or about 5 to about 20 pounds of light weight aggregate are used for each square yard of the composition layer, preferably between about 25 to 40 pounds of conventional mineral aggregate per square yard. Nominally sized aggregate of ¼ or ⅜ inch is normally used; however, smaller sized aggregate such as sand or larger aggregate sizes can also be employed. The resulting product is then allowed to cool to form an elastomeric cold patch. The patch can be cut, if desired, into various sizes and shapes.

Alternatively, after the hot elastomeric material has been prepared, that is the hot jellied composition, aggregate, preferably preheated to a temperature between about 300° and about 500°F, can be added to the hot composition before it is applied to the flexible backing sheet. In this method of preparation, we have employed about equal weights of aggregate with equal weight of the hot composition. However, the end product will preferably have between about 20 and about 50 pounds of aggregate per square yard of cold patch, preferably between about 25 and 40 pounds of aggregate per square yard of cold patch.

The cold patch of the present invention also can be prepared without a sheet backing. The hot elastomeric material is applied to a non-adhesive surface to which the hot elastomeric material will not adhere, such as a plastic or Teflon resin coated surface. The aggregate can be added to the composition before it is applied to the surface or it can be applied afterwards and tamped and rolled therein. The composition is applied at such a rate that the thickness of the resulting cold patch is normally between about 0.2 and about 0.25 inches in thickness. However, the thickness of the elastomeric cold patch layer can be thinner, such as about 0.05 inch in thickness, or thicker, such as about 0.5 inch in thickness, as described above. The cold patch after cooling should be treated with a material that will prevent sticking of the cold patch to other surfaces. Lime has been found to be an ideal material for this application. However, other adhesive breaking types of materials known to the art to prevent sticking and tacking can also be used. An adhesive breaker when applied to the surface of the patches, inhibits the patches from sticking together, especially when the patches are stored in stacks.

The elastomeric paving repair composition is prepared by heating paving grade asphalt with a penetration range of 10 through 300 to a temperature within the range of from about 300 to about 500°F and adding particulate rubber (½ inch to +200 mesh USS) thereto. The resulting mixture is thoroughly mixed until the composition gels or becomes jellied. No additional heating is required once the rubber is added to the asphalt. About one part rubber is added to each 2 to 3 parts asphalt. I have used 85-100 penetration grade asphalt in my test work for convenience although other penetration grades of paving asphalt such as 120-150 grade are equally suitable and are more generally used for practice of the invention.

Hydrocarbon rubbers are used in the present inventions. By the term "hydrocarbon rubber" is meant non-oil resistant asphalt-soluble rubbers. Non-oil resistant asphalt-soluble rubbers are those rubbers that are partially soluble to the extent from about 2 to about 12% by weight in asphalt and are attacked by, react with, or are affected by oils, such as lubricating oils, hydraulic oils and the like. Suitable rubbers that can be employed include unvulcanized, vulcanized or reclaimed rubbers including natural rubber, (NR, polyisoprene polymer), isoprene rubber (IR, polyisoprene polymer), butadiene ruber (BR, polybutadiene polymer), butadiene-styrene rubber (SBR, butadiene-styrene copolymer), butyl rubber (IIR, the isobutylene isoprene polymer) and ethylene propylene rubber (EPM and EPDM, ethylene propylene copolymers and terpolymers) which are unvulcanized, vulcanized or reclaimed.

The reclaimed rubber can be devulcanized or partially devulcanized and can be prepared from vulcanized or unvulcanized rubber by the digester process, Heater or Pan process, high pressure steam process, Lancaster-Banbury process, reclamation or other conventional reclaiming processes (Maurice Morton, *Introduction to Rubber Technology*, Van Nostrand Reinhold Co., New YOrk, 1959, pps. 404-435). Normally, the reclaimed rubber will be prepared from old, worn tires, tire scrap, innertube scrap, retread scrap, tire peel, tire carcass, rubber buffings and other rubber scrap.

In the practice, other types of rubbers, that is, oil resistant and/or non-asphalt soluble rubbers have not been found suitable for preparing the hot elastomeric pavement repair material. For example, rubber which has not been found suitable for the composition are: nitrile (NBR, butadiene acrylonitrile copolymers), epichlorohydrin (ECO, epichlorohydrin polymer and copolymer), neoprene rubber (CR, chloroprene polymers), hypalon (CSM, chloro-sulfonated polyethylene polymers), urethane rubber (AU, EU, urethane polymers or elastomers), polysulfide or thiokol rubber (T, organic polysulfides), silicone rubber (Si, organic silicone polymers), fluoro silicone rubber (FSi, fluorinated organic silicone polymers), fluoro elastomer (FTM, fluorocarbon polymers), acrylic rubbers and polyacrylates (ACM, copolymer of acrylic ester and acrylic halide). These rubbers have been found to be unsuitable for the present invention because they do not react in the desired manner with asphalt under the described conditions to form the required jellied composition.

The following types of rubbers are preferred for use in the invention: (1) ground whole tire rubber (with and without carcass fabric residue); (2) unprocessed rubber buffings, that is rubber buffings that have not been subject to devulcanization or reclaiming processes (a by-product of tire retreading); (3) ground innertubes (natural rubbers and synthetic butyl rubbers); (4) reclaimed rubber; (5) partially devulcanized reclaimed rubber; and (6) asphalt soluble rubber. The preferred particle size for the rubber is from about 4 mesh to about +200 mesh USS. Unprocessed rubber refers to rubber that has not been chemically or thermally altered. Unprocessed rubber includes rubbers that have been ground, screened, decontaminated, and treated to remove metals, cord and fabric therefrom.

The grading or sizing for mineral aggregate or chips used in preparation of the cold patch can vary but I have found the following three-eighth inch nominal size chip very successful:

| Sieve Size | % Passing |
| --- | --- |
| ½" | 100 |
| ⅜" | 70–100 |
| 8 | 0–5 |
| 200 | 0–2 |

The chips can be optionally treated with asphalt to eliminate the dust problem. The chips are coated by heating them to a temperature between 250° and 325°F and pre-coating them with a small amount of asphalt. With ⅜ inch nominal size chips the application rate is about 25–40 pounds of chips per square yard of hot elastomeric material.

When repairing pavements in the airport area, we prefer to use ¼ inch nominal chips in the patches because there is less hazard that the chips will be torn loose from the elastomeric material and sucked into the jet engine where they can do severe damage. The following ¼ inch nominal size chip specification has been found to be very satisfactory for airport use.

| Sieve Size | % Passing |
| --- | --- |
| ⅜" | 100 |
| ¼" | 80–100 |
| 8 | 0–5 |

-continued

| Sieve Size | % Passing |
| --- | --- |
| 200 | 0–2 |

The hot elastomeric material can also be dressed with sand as a mixture of aggregate and sand.

The elastomeric cold patch is applied directly to the pavement area to be repaired. The pavement area to be repaired is first swept clean of all debris and made thoroughly dry. A tack coat of hot asphalt, solvent cut asphalt such as kerosene and asphalt, or an asphalt solvent, such as gasoline or kerosene is applied to the area to be repaired. Alternatively, if the pavement surface is asphaltic, the surface can be made adhesive and tack by heating with a torch or the like. The elastomeric cold patch is then applied to the area to be repaired and rolled or tamped thereon.

Figure 1:
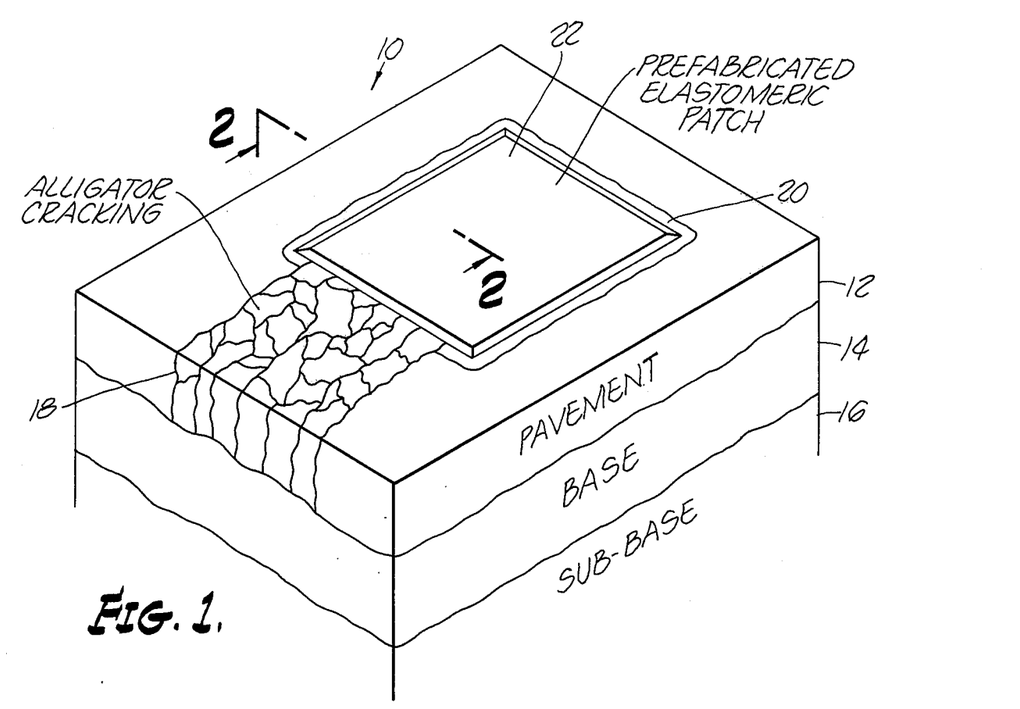
FIG. 1 is a perspective cut-away view of a fatigue cracked pavement structure repaired with the patch of the present invention.

Referring to FIG. 1, the alligator cracked pavement structure 10 is comprised of the top pavement layer 12, a base 14, and a subbase 16. Pavement structures vary for different conditions; normally, however, the pavement top layer 12 consists of aggregate bound with asphalt, or concrete. The pavement layer 12 is generally 1 –6 inches in thickness; however, in certain situations such as the landing area of a runway, the thickness of the layer 12 can be thicker. The base 14 normally consists of sized aggregate fill, preferably crushed aggregate. In some situations in order to give the pavement structure greater rigidity, the aggregate is cemented together with asphalt or cement. In the latter situation, there is generally a sub-base layer 16 situated below the base layer which is filled with aggregate or other road building material. The final layer of most pavement construction is the sub-grade (not shown) which is compacted earth which can be compacted with aggregate and/or treated with cement, asphalt or other additives.

The alligator cracks 18 generally propagate through the layer 12; however, when the base has been cemented together with asphalt or cement the cracks can also reflect through this layer. Water has a tendency to flow through the cracks and soften the underlying base, sub-base or sub-grade to eventually destory all support for the layer 12 which then displaces downwardly.

Figure 2:
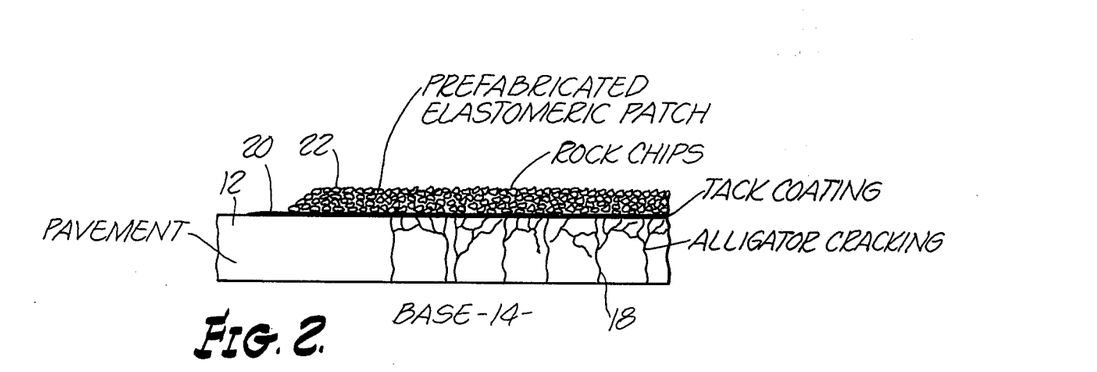
FIG. 2 is an enlarged cross-sectional view of the repaired portion of the pavement structure of FIG. 1 taken along lines 2—2 of FIG. 1.

The surface of layer 12 is first cleaned of all loose debris and dried. The surface is then treated or tacked prior to application of an elastomeric cold patch 22 with a tack coat 20. The surface of layer 12 can be tacked with hot asphalt, solvent cut asphalt, such as paving grade asphalt cut with kerosene or the like, with one of the commercially available rubberized-asphalt compositions which contain up to 5% rubber, with an asphaltic solvent such as kerosene or gasoline and the like. In addition, the top surface of layer 12 can also be heat treated with a torch to make the asphalt in the pavement, assuming that pavement layer 12 is asphaltic, adhesive and tacky.

After the surface of pavement 12 has been tacked, the cold patch 22 is applied to the tack coat 20 and preferably rolled or tamped thereon to ensure maximum adhesion between the bottom of the patch 22 and the surface of pavement 12 and to force out any air bubbled trapped between the underside of patch 22 and the pavement surface. If the patch has a release type backing as described below, the backing is removed from the patch prior to its application to the pavement. If the patch has a backing that is permanent, the backing side of the patch can face either up or down when the patch is applied to the pavement. Normally, after a period of time, vehicular traffic will wear the backing off the top surface of the patch when facing upward.

In FIG. 1, the cold patch 22 is illustrated as covering only a portion of the alligator cracked area of the pavement structure 10. Preferably, a large enough cold patch will be used to cover the entire area of alligator cracking. Although a series of cold patches can be used to repair a large area, difficulties may be encountered in sealing the adjacent sides or joints of the cold patches so that water will not seep there between. Adjacent cold patches can be permanently sealed by applying the hot elastomeric pavement repair material from which the cold patch is prepared to the joints.

The cold patch 22 normally has a thickness of from about 1/20 to about ½ inches in thickness, preferably from about 0.18 to about 0.25 inches in thickness. Each square yard of cold patch contains about 25–40 pounds of aggregate cover which has been blended, tamped or contacted into the cold patch as described herein. The top surface of the cold patch 22 is completely dressed or exposed to aggregate so there are no bald spots. The aggregate protects the elastomeric composition of the cold patch 22 from abrasion and stripping by vehicular traffic.

Figure 3:
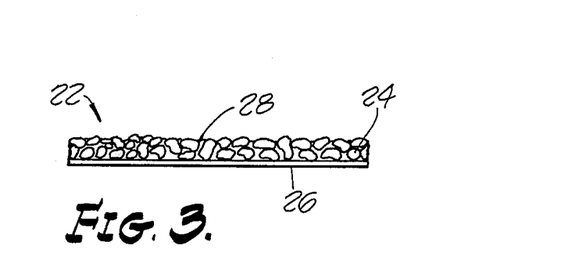
FIG. 3 is a cross-sectional view of one embodiment of the cold patch of the present invention.

Referring to FIG. 3, the cold patch 22 consists of a backing layer 26, aggregate 24 and the elastomeric pavement repair material composition layer 28. The backing 26 can be a permanent backing or can be a release type backing. The backing is normally prepared from paper, cardboard or plastic and if it has a release type backing, it has a coating of plastic, such as a polyvinylchloride adjacent to the composition layer 28. The composition layer 28 is normally from about 1/20 to about ½ inches in thickness, preferably from about 0.2 to about 0.25 inches in thickness. The aggregate chips 24 are normally from about ¼ to about ⅜ inch chips; however, smaller size chips including sand, and larger size chips can be used. The aggregate permeates the complete thickness of layer 28 and projects above the top surface of layer 28 so that no bald spots or uncovered areas are exposed.

In an alternative embodiment of the present invention, the cold patch 22 has no backing layer 26. The backing layer is generally used in order to enhance production of the cold patch and to prevent cold patches from sticking to one another when stacked or piled. However, the cold patch can be prepared without such a backing layer and can be covered with an adhesive breaker, such as talc, to prevent sticking when cold patches are piled.

The temperature susceptibility of the elastomeric rubber-asphalt material of the patch is far less than with paving grade asphalt alone. This is, of course, a tremendous advantage in achieving control of reflective cracking. The elastomeric patch retains some flexibility down to below freezing temperatures although it does soften some under summer heat, it apparently does not soften to such a point that it is picked up by vehicular traffic. The elastomeric patch will be quite soft to the touch when warm and show tracking under truck tires. However, instead of the patch material shoving and rolling under vehicular traffic, it rebounds and tends to resume its original location. A somewhat leathery skin develops on the surface of the elastomeric patch after application and cooling which is dry and resists pickup. The elastomeric patch will pick-up, however, if a tacky material such as asphalt is applied to this dry surface. However, the aggregate or sand covering protects against this type of problem.

As far as I have been able to judge, there is no apparent difference in the performance of pavement repair panels made with compositions prepared with partially devulcanized reclaimed rubber and ordinary reclaimed shredded rubber obtained from a local vulcanizing shop. There is, however, a difference in the reaction of the two rubbers to asphalt. The elastomeric composition prepared from partially devulcanized reclaimed rubber seems to be a stiffer product when mixed at higher temperatures, whereas the reverse is true with elastomeric compositions prepared from conventional reclaimed rubber. The ideal temperature for asphalt, in preparation and mixing of the elastomeric composition, appears to be approximately 420°F.

Descriptions and examples of the working of the present invention are set forth in the following examples. Further information regarding the present invention can be found in my paper entitled A NEW PATCHING MATERIAL FOR PAVEMENT FAILURES published in the *Highway Research Record*, No. 146, pps, 1-16 of the Highway Research Board, Div. of Eng., National Research Council, National Academy of Sciences National Academy of Engineering, Washington, D. C. (1966), which is incorporated by reference herein.

EXAMPLE I

A hot jellied elastomeric composition was prepared from 2 parts by weight of 85-100 penetration grade asphalt and one part by weight of particulate partially devulcanized reclaimed rubber. The asphalt was first heated and the rubber was then added thereto. The resulting mixture was mixed at a temperature of about 420°F to form the hot jellied elastomeric composition.

EXAMPLE II

A hot jellied elastomeric composition was prepared from two parts by weight of 85-100 penetration grade asphalt and 1 part by weight of unprocessed, shredded reclaimed rubber from a rubber tire shop. The asphalt was heated to a temperature of 440°F; thereafter, the rubber was heated and mixed into the asphalt to form the hot jellied elastomeric composition.

EXAMPLE III

A hot jellied elastomeric composition was prepared from 5 gallons of 85-100 penetration grade asphalt and 21 pounds of partially devulcanized reclaimed rubber (two parts by weight of asphalt to one part by weight of rubber). The asphalt was heated to a temperature of about 430°F. The rubber was added to the hot asphalt and mixed therein to form the hot elastomeric composition.

EXAMPLE IV

A hot jellied elastomeric composition was prepared from 15 gallons of 85-100 penetration grade asphalt and 62 pounds of partially devulcanized reclaimed rubber (two parts by weight of asphalt to one part by weight of rubber). The asphalt was heated to 400°F. The rubber was added to the hot asphalt mixed therein to form the hot jellied composition.

EXAMPLE V

A hot jellied elastomeric composition was prepared from 2 parts by weight of 85-100 penetration grade asphalt and one part by weight of unprocessed, shredded, reclaimed rubber. The asphalt was heated to a temperature of about 420°F. The rubber was added to the hot asphalt and mixed therein to form the hot jellied composition.

EXAMPLE VI

A hot jellied elastomeric composition was prepared according to the procedure of Example I except that the asphalt was heated to a temperature of about 450°F when the rubber was added thereto.

EXAMPLE VII

A hot jellied elastomeric composition was prepared from 2 parts by weight of 85-100 penetration grade asphalt and 1 part of No. 30 mesh ground whole tire rubber (rubber No. 9306 of U.S. Rubber Reclaiming Company). The asphalt was heated to a temperature of 450°F. The rubber was added to the hot asphalt and mixed therein to form the hot jellied elastomeric composition.

EXAMPLE VIII

A hot elastomeric jellied composition was prepared according to Example VII except that three parts of asphalt were used and the asphalt was heated to a temperature of about 400°F when the rubber was added thereto.

EXAMPLE IX

A hot jellied elastomeric composition was prepared from 2 parts by weight of 85-100 penetration grade asphalt and 1 part by weight of number V-17 asphalt soluble rubber (a product of the U.S. Rubber Reclaiming Company). The asphalt was heated to a temperature of about 410°F. The rubber was added thereto and mixed therein to form the hot jellied composition.

EXAMPLE X

One hundred grams of 85-100 penetration grade asphalt were weighed into each of four separate beakers. The beakers were labeled No. 1, No. 2, No. 3 and No. 4 and the contents were heated to 350°F, 400°F, 450°F, and 500°F respectively. Fifty grams of partially devulcanized reclaimed rubber were mixed with the asphalt contents of each beaker to yield the following results:

(1)

Temperature at time of mixing — 350°F.
Consistency — thin slurry
Mixed for 2 min. before observing consistency.
Consistency after 16 hr. curing at 140°F — soft, sticky, and stringy.
Consistency after 4 hr. curing at 250°F — soft.

(2)

Temperature at time of mixing — 400°F.
Consistency — slurry.
Mixed for 2 min. before observing consistency.
Temperature after mixing — 300°F.
Consistency after 16 hr. curing at 140°F — soft, sticky, and stringy.
Consistency after 4 hr. curing at 250°F — soft.

(3)

Temperature at time of mixing — 450°F.
Temperature after mixing — 330°F.
Mixed for 2 min. before observing consistency.
Consistency — thick slurry.
Consistency after 16 hr. curing at 140°F — semi-soft, not sticky.
Consistency after 4 hr. curing at 250°F — soft.

(4)

Temperature at time of mixing — 500°F.
Temperature after mixing — 350°F.
Consistency — very thick slurry
Mixed for 2 min. before observing consistency
Consistency after 16 hr. curing at 140°F — spongy, not sticky.
Consistency after 4 hr. curing at 250°F — soft.

The elasticity of the cold elastomeric composition was better with the compositions mixed at the higher temperature and was the best with sample No. 4 which was prepared at 500°F. However, the hot workability of sample No. 4 was very poor at a temperature of 500°F. Compositions prepared at asphalt temperatures between about 400 and about 450°F. appear to be most satisfactory. The elastomeric composition was somewhat brittle at 19°F but ductile at 36°F.

EXAMPLE XI

The four elastomeric compositions prepared in the previous example were cooled to room temperature. A pea size portion was taken from each sample and placed on a shiney piece of tin plate and the tin plate was placed in the oven at an angle of 30°. The amount of flow for each sample was observed under various temperatures to yield the following results:

| [Sample No.] (Mixing Temp.) | [Flow] |
| --- | --- |
| Flow at 170°F for 2 hr. | |
| 1 (350 deg) | very small |
| 2 (400 deg) | none |
| 3 (450 deg) | none |
| 4 (500 deg) | none |
| Flow at 210°F for 4 hr. | |
| 1 (350 deg) | very small |
| 2 (400 deg) | none |
| 3 (450 deg) | none |
| 4 (500 deg) | none |
| Flow at 330°F for 2 hr. | |
| 1 (350 deg) | 4 in. |
| 2 (400 deg) | 2 in. |
| 3 (450 deg) | 3 in. |
| 4 (500 deg) | none |

EXAMPLE XII

One gallon samples of the elastomeric pavement repair material made in Examples I and II were molded in a steel concrete cylinder test can. After the mixture had cooled, the cans were removed and the two specimens were removed. Each block measured 6 in. in diameter and 7 to 8 inches in height. The specimen molded from the elastomeric pavement repair material of Examples II was the designated specimen A and the specimen molded from the elastomeric pavement repair material of Example I was designated as specimen B. These specimens were tested for elasticity (compression and recovery) as follows: the height of each specimen was determined; each specimen was compressed by applying a vertical load until a 2in. displacement in height was observed. The load was removed in one test immediately, and another test 5 minutes after the 2 in. displacement. The height of each specimen was measured at intervals of 0 time, 1 hour, 12 hours after the load had been removed. The recovery height of each specimen was determined as an indication of the elastic properties of the material. Recovery in inches as the percentage of the 2 in. displacement length, was designated as the percent of the recovery of the elastomeric pavement repair material. The following results were obtained:

Specimen A

Mixing temperature of asphalt: 440°F
Height of test specimen before loading: 7.75 in.
Height of test specimen with load: 5.75 in.
Height of test specimen 1 hr. after immediate release of load: 7 in.
Percent recovery = 1.25/2 = 63 percent.
Height of test specimen before loading: 6 in.
Height of test specimen when loaded for 5 min.: 4 in.
Percent recovery (1 hr. after removing load) = 0.5/2 = 25%.
Height of test specimen 12 hr. after removing load: 5 in.
Percent recovery 12 hr. after removing load = 1 in./2 in. = 50 percent.

Consistency Test

Cured for 24 hr. at 140°F.
Observation: sticky and soft.

Specimen B

Mixing temperature of asphalt: 420°F.
Height of test specimen before loading: 7 in.
Height of test specimen with load: 5 in.
Height of test specimen 1 hr. after immediate release of load: 6.75 in.
Percent recovery 1 hr. after release of load = 1.75/2 in. = 88 percent.
Height of test specimen when loaded for 5 min.: 4.75 in.
Height of test specimen 1 hr. after release of load: 6 in.
Height of test specimen 12 hr. after removing load: 6.50 in.
Percent recovery 1 hr. after removing load applied for 5 min. = 1 in./2 in. = 50 percent.
Percent recovery 12 hr. after removing load applied for 5 min. = 1.5 in./2 in. = 75 percent.

Consistency Test

Cured for 24 hr. at 140°F.
Observation: gummy and firm.

It appears that the temperature of the asphalt at the time of mixing with the rubber has an effect on the elastomeric composition product. Specimen B showed more resiliency and elasticity than Specimen A, possibly indicating some damage to the rubber at higher asphalt temperatures. However, in field practice we have found that there is a time-temperature correlation and high asphalt temperatures do not necessarily affect the elastomeric product if the hot composition's high temperature is not maintained for a long period.

The above examples show that the use of either partially devulcanized reclaimed rubber, conventional shredded rubber derived from buffing, reclaimed rubber, ground whole tire rubber, tire buffings and asphalt soluble rubber together with a paving grade asphalt in the proportions of from about 1 part of rubber to about 2 to 3 parts of asphalt can be prepared into the elastomeric composition for the cold patches of the present invention which will prevent reflection cracking from elastic-type failures caused by fatique cracking of the pavements at a very nominal cost. It is believed that this has never been achieved by skin patching the pavement surfaces with any other material. This should prove to be a boon to maintenance forces throughout the country who are plagued with repairing this type of failure in asphaltic anc concrete pavements. Naturally the present patches can be used to repair pavements or surfaces other than pavements and surfaces subject to fatigue type cracking. The patch can be used to repair pavements or surfaces subject to plastic type failure or surface-type failure. In addition, the patches can be used to repair holed pavements and surfaces.

EXAMPLE XIII 120-150 penetration grade asphalt was heated to a temperature of 475°F. Rubber tire buffings were added to the hot asphalt in the proportion of 3 parts of asphalt to 1 part of rubber. Ninetyeight percent of the rubber passed a No. 25 Sieve (AASHO Designation M-92). The rubber was free from fabric, wire or other contaminating materials. The rubber had a small amount of calcium carbonate (not more than 4%) which was included to prevent the rubber particles from sticking together. The resulting mixture was mixed for a period of less than 5 minutes to form a jellied semi-fluid material which was the hot elastomeric material.

I have found that when the hot asphalt is heated to a temperature of 440°F or less, the hot elastomeric composition prepared therefrom requires more than 5 minutes of mixing with the rubber. In such a situation, preferably 95% of the rubber shall pass a No. 16 Sieve and not more than 15% of the rubber shall pass a No. 25 Sieve. When the asphalt is heated to a temperature between 440° and 500°F, the hot elastomeric composition is formed in less than 5 minutes after the rubber has been added and mixed with the hot asphalt. At the temperatures of 475° and 500°F, the hot elastomeric composition is frequently formed in a matter of seconds. When the composition is prepared with asphalt at temperatures in excess of 440°F, preferably 98% of the rubber shall pass a No. 25 Sieve.

In geographical areas where the temperatures seldom go below freezing, an excellent elastomeric composition for cold patches can be prepared from about three parts asphalt to about one part rubber In areas where freezing occurs more than once or twice during the year an excellent elastomeric composition for cold patches can be prepared from about 7 parts asphalt and about 3 parts rubber by weight.

When a large surface is to be repaired, and several patches are to be laid, all joint edges of the laid patches should be sealed with a sealing material. Naturally precaution should be taken to avoid skips and overlaps at joints to prevent gaps between the joints which would allow water or other materials to seep between the joints.

The composition of the present patches ages far more slowly than conventional asphalt pavement compositions. A combination of the rubber and asphalt as set forth in this application seem to mutually protect against oxidation and degradation. The compositions remains pliable and elastic over a period of many years.

The elastomeric cold patches of the present invention has been employed in many pavement services with very satisfying results. The material has been applied to streets, roads and highways. It has been demonstrated and proven that the present elastomeric cold patches will outlast conventional patching materials many times over.

The elastomeric cold patches of the present invention has a much lower temperature susceptibility than conventional asphalt and is less prone to brittleness in cold weather and bleeding in hot weather.

The elastomeric cold patches prepared from the elastomeric composition have been applied to moutain roads (elevation 700 feet) wherein the patches are subject to below freezing and 100°F plus temperatures. Many of these patches are over seven years old and are still showing no sign of cracking or stripping.

The adhesion characteristics of the elastomeric cold patches in the presence of water have proven to be far superior to that of asphalt alone and the susceptibility of aggregate stripping has been reduced to a level far below that of normal asphalt-aggregate pavement.

When the elastomeric cold patch is applied as a membrane over a pavement area, it forms an impervious surface or layer which prevents the entry of water through the cracks to enter the base and subgrade underlying the pavement surface. This results in a long term stabilization of the subgrade and base moisture which tends to reduce the magnitude of the deflections in the more stabilized subgrade. The rapid progression of local failure is often due to reduced subgrade support caused by the entrance of surface water through the surface cracks in the pavement.

EXAMPLE XIV

An hot elastomeric material prepared from 120-150 penetration grade asphalt which was heated to a temperature between about 350° and 400°F. Ground tire rubber, 16–25 mesh, was added to the hot asphalt in the proportions of 3 parts of asphalt to about 1 part rubber. The resulting mixture was stirred causing the mixture to become a jellied composition which occurred within ½ to 1 hour after the introduction of the rubber. The addition of the rubber cooled the resulting mixture by about 50°F.

EXAMPLE XV

Paving grade asphalt, 85-100 penetration grade, was heated to about 425°F. Granular scrap rubber was added to the hot asphalt in the weight ratios of about 75% asphalt to about 25% rubber and mixed. The resulting mixture was mixed until a hot viscous gel composition was formed. The hot viscous gel composition was applied to a paper backing having a release type surface. The composition was poured into a form and screed to form a layer having an average thickness of about ⅛ inch. About a half gallon of the composition was applied per square yard of backing. Immediately thereafter, a half gallon of light-weight aggregate was applied to the surface of the hot elastomeric material and rolled therein. After the hot elastomeric material had cooled to form the elastomeric cold patch, the surface of the patch was brushed off to remove all loose aggregate. The form was removed and the finished elastomeric cold patch was dusted with hydrated lime as an adhesive breaker.

EXAMPLE XVI

The hot jellied elastomeric composition prepared in Example I is applied to a sheet of newspaper as a thin layer. About 1 gallon of the hot composition is applied to each square yard of newspaper. Immediately after application of the hot composition, 40 pounds of nominal ⅜ inch mineral aggregate is applied to the exposed surface of the hot composition and worked therein. An elastomeric cold patch is obtained after the hot composition has cooled.

Similar cold patches can be made from the hot jellied elastomeric composition of Examples II – IX and XIII – XV inclusive.

Repair of the pavement subject to cracking is accomplished by sweeping the area to be repaired free of all debris and drying it. The pavement surface is tacked with solvent cut asphalt. The elastomeric cold patch is applied to the tacked area and rolled thereon to insure good adhesion between the cold patch and the surface of the pavement. The paper side of the cold patch faces upward.

The pavement surface can be tacked with conventional tacking composition such as asphalt and rubberized bitumem. If the pavement surface is asphaltic, the surface can also be tacked by heating the surface with a torch or by applying asphalt solvent.

EXAMPLE XVII

The hot jellied elastomeric composition of Example V was applied to a flexible sheet and formed into a layer. The sheet had a release type backing prepared from polyvinyl chloride. The hot composition was applied to the release type backing. About 0.4 pounds of the hot composition was applied per square yard of sheet. While the composition was still hot, 20 pounds of nominal ⅜ inch mineral aggregate was applied to the hot composition and worked therein. After the hot composition had cooled, an elastomeric cold patch was obtained.

The pavement is repaired by cleaning the area to be repaired of all debris and dried. The area is tacked with asphalt. The elastomeric cold patch is cut to size so that its edges extend 6 inches beyond on all sides of the area to be repaired. The sheet is removed from the elastomeric cold patch and the cold patch is applied raw side down to the tacked area. The raw side, is the side which was attached to the sheet. The elastomeric cold patch is tamped and rolled to insure good adhesion between the pavement surface and the cold patch.

EXAMPLE XVIII

The hot jellied elastomeric composition of Example VII is mixed with an equal amount by weight of nominal ¼ inch aggregate. The resulting mixture is applied to a polyethylene film. About ½ gallon of the composition is applied per square yard of the polyethylene sheet. The exposed surface of the mixture is dressed with sand. After the hot composition cools, the resulting elastomeric cold patch is dusted with lime.

An asphaltic pavement to be repaired is swept clean of all debris and dried. The area to be repaied is tacked with kerosene. The elastomeric cold patch is applied to the tacked area with the polyethylene sheet facing upwards. The cold patch is tamped and rolled on to the pavement to insure good adhesion between the patch and the pavement surface.

EXAMPLE XIX 85-100 penetration grade asphalt was heated to a temperature of about 420°F and then mixed with ground partially devulcanized reclaimed rubber. The portions of asphalt and rubber were two to one by weight. The rubber was mixed with hot asphalt until a thick jellied composition formed which had the viscosity of a thick pancake batter. The hot elastomeric material was applied to a clean pavement surface at the rate of a half gallon of hot material per square yard of pavement area. The hot elastomeric material was completely covered after application with ½ inch seal coat aggregate. Four years after this patch was applied, the patch was still in excellent condition with no stripping or cracking observed.

An adjacent patch was made with the same above material at the same time except the composition was applied at a rate of one gallon hot material per square yard of pavement area. After 4 years of use, the patch was still in excellent condition showing no reflection cracks, surface wear or shoving of the material.

EXAMPLE XX 60-70 penetration grade paving asphalt was heated to a temperature of about 390°F. Ground tire rubber (particle size 0.044 inch) was added to the hot asphalt and thoroughly mixed therein for 10 minutes while heating was continued to form a hot thick jellied mixture. The rubber and asphalt were added in the portions of one part rubber to two parts asphalt.

Other paving grade asphalts can be used in preparation of the hot elastomeric material; for example, 10-10, 10-20, 40-50, 60-70 85-100, 120-150, and 200-300 paving grade asphalts can also be employed.

EXAMPLE XXI

Paving asphalt, 85-100 penetration grade, was heated to 420°F. Granular scrap rubber was added to the hot asphalt in the weight ratio of about 75% asphalt to about 25% rubber and mixed. The mixing was continued until a hot viscous gel composition, the elastomeric composition, was formed. An equal volume of light weight aggregate was added to the hot elastomeric composition and was stirred therein. The aggregate was preheated to a temperature about 350°F. After the aggregate was uniformly mixed in the hot elastomeric composition, the hot composition was applied to a paper backing having a release type surface, in a form and screed thereon to form a layer having an average thickness of about ¼ inch. After the hot elastomeric material had cooled, the form was removed yielding the elastomeric cold patch. The cold patch was powdered with lime as an adhesive breaker.

EXAMPLE XXII

A hot jellied elastomeric composition was prepared according to the procedure in Example I with the exception that the asphalt was heated to a temperature of 440°F. To the hot composition there was added and mixed an equal weight of ¼ inch crushed gravel that was preheated to a temperature of 470°F. After the mixture was thoroughly mixed, it was poured on Kraft wrapping paper at the rate of about 1 kilogram of the mixture per square foot of paper to yield an elastomeric cold patch having an average thickness of about ¼ inch.

The resulting patch was applied to city streets. The area of the pavement to be repaired was swept of all debris and tacked with about 0.05 gallon of 90 penetration grade asphalt (45%) cut back with jet fuel (55%).

Panels have been prepared from the above hot jellied elastomeric composition employing lesser amounts of aggregate (50% aggregate by weight of the composition and 30% aggregate by weight of the composition) with satisfactory results.

EXAMPLE XXIII

The following panels were prepared according to the procedure of Example XXI.

Panel No. 3 was prepared from "Golden Bear" 85-100 penetration grade asphalt, 16–24 mesh rubber buffings supplied by Atlos Rubber Company of Los Angeles, California (hereinafter referred to as "Atlos rubber") and minus ⅜ inch aggregate chips. One part rubber was mixed with 2 parts of asphalt by weight at 425°F. The chips were preheated (450°F) and spread on heavy paper backing; the asphalt-rubber mixture was poured over the chips to form an elastomeric cold patch.

Panel No. 4 was prepared from "Santa Maria" 85-100 penetration grade asphalt, Atlos rubber (16–24 mesh) and −3/8 inch aggregate chips in the same manner as panel No. 3.

Panel No. 5 was prepared from Edington 85-100 penetration grade asphalt, Atlos rubber (−24 mesh) and −3/8 inch chips. One part rubber was mixed with 3 parts asphalt by weight at 425°F. Hot aggregate chips (450°F) were added to the resulting hot elastomeric composition in an equal weight portion, that is an amount of chips equal in weight the amount of the hot elastomeric composition, and mixed. The resulting mixture was spread on thin paper backing to form an elastomeric cold patch having an area of approximately 4 square feet and a thickness of about ¼ inch.

Panel No. 6 was prepared from Edington 85-100 penetration grade asphalt, Atlos rubber 916–24 mesh) and −⅜ inch chips. One part rubber was mixed with 2 parts asphalt by weight at 425°F. The resulting hot elastomeric mixture was spread on release paper and coated the exposed surface was coated with the hot composition with pre-heated chips (450°F).

Panel No. 12 was prepared from Edington 85-100 penetration grade asphalt, Atlos rubber (-24 mesh) and −3/8 inch chips. One part rubber was mixed with four parts asphalt by weight at 425°F. Added hot aggregate chips (450°F) were added to the elastomeric composition in an equal portion and mixed. The resulting mixture was spread on a thin paper backing to form an elastomeric cold patch. The patch covered an area approximately 4 feet square and had an average thickness of about ¼ inch.

Patch No. 4 was applied to a cracked pavement with the aggregate-coated side up. Pavement was first tacked with 60-70 penetration grade asphalt cut 50% with chlorothene.

What is claimed is:

1. An elastomeric cold patch comprising a thin flexible backing sheet; and a layer of elastomeric pavement repair material consisting essentially of 10 through 300 penetration grade asphalt and particulate non-oil resistant asphalt soluble hydrocarbon rubber that have been mixed together in a ratio of about 2 to about 3 parts asphalt to about 1 part rubber by weight at a temperature of from 300°F to about 500°F to form a hot jellied composition from which the layer is prepared; said flexible backing sheet secured to the under side of said layer wherein the layer is impregnated with aggregate.

2. The elastomeric cold patch as defined in claim 1 wherein said layer is impregnated with from about 5 to about 20 pounds of light weight aggregate per square yard of cold patch.

3. The elastomeric cold patch as defined in claim 1 wherein said layer is impregnated with from about 25 to about 40 pounds of conventional mineral aggregate per square yard of cold patch.

4. The elastomeric cold patch as defined in claim 1 wherein the asphalt of the elastomeric pavement repair material of said layer is paving grade asphalt.

5. The elastomeric cold patch as defined in claim 4 wherein the hydrocarbon rubber of the elastomeric pavement repair material of said layer is selected from the group consisting of ground whole tire rubber, unprocessed rubber buffings, ground innertube rubber, reclaimed rubber, partially devulcanized reclaimed rubber and asphalt soluble rubber.

6. The elastomeric cold patch as defined in claim 4 wherein the hydrocarbon rubber of the elastomeric pavement repair material is unvulcanized, vulcanized or reclaimed rubber selected from the group consisting of natural rubber, isoprene rubber, butadiene rubber, butadiene-styrene rubber, butyl rubber and ethylene propylene rubber.

7. The elastomeric cold patch as defined in claim 1 wherein the upper side of the layer has an aggregate dressing.

8. The elastomeric cold patch as defined in claim 1 wherein said layer is from about 0.1 to about 0.5 inches in thickness.

9. The elastomeric cold patch as defined in claim 8 wherein said layer is impregnated with from about 20 to about 50 pounds of conventional mineral aggregate per square yard of said layer.

10. The elastomeric cold patch as defined in claim 9 wherein the upper side of said layer has a dressing of aggregate.

11. An elastomeric cold patch comprising a thin flexible backing sheet; and a layer of elastomeric pavement repair material consisting essentially of 10 through 300 penetration grade asphalt and particulate non-oil resistant asphalt soluble hydrocarbon rubber that have been mixed together in a ratio of about 2 to about 3 parts asphalt to about 1 part rubber by weight at a temperature of from 300°F to about 500°F to form a hot jellied composition from which the layer is prepared; said flexible backing sheet secured to the under side of said layer wherein the upper side of the layer has an aggregate dressing.

12. The elastomeric cold patch as defined in claim 11 wherein said layer is impregnated with from about 5 to about 20 pounds of light weight aggregate per square yard of cold patch.

13. The elastomeric cold patch as defined in claim 11 wherein said layer is impregnated with from about 25 to about 40 pounds of conventional mineral aggregate per square yard of cold patch.

14. The elastomeric cold patch as defined in claim 11 wherein the asphalt of the elastomeric pavement repair material of said layer is paving grade asphalt.

15. The elastomeric cold patch as defined in claim 14 wherein the hydrocarbon rubber of the elastomeric pavement repair material of said layer is selected from the group consisting of ground whole tire rubber, unprocessed rubber buffings, ground innertube rubber, reclaimed rubber, partially devulcanized reclaimed rubber and asphalt soluble rubber.

16. The elastomeric cold patch as defined in claim 14 wherein the hydrocarbon rubber of the elastomeric pavement repair material is unvulcanized, vulcanized or reclaimed rubber selected from the group consisting of natural rubber, isoprene rubber, butadiene rubber, butadiene-styrene rubber, butyl rubber and ethylene propylene rubber.

17. The elastomeric cold patch as defined in claim 11 wherein said layer is from about 0.1 to about 0.5 inches in thickness.

* * * * *